(12) United States Patent
Sogabe et al.

(10) Patent No.: US 6,908,676 B2
(45) Date of Patent: Jun. 21, 2005

(54) TRANSMISSION BELT AND METHOD OF TREATMENT FOR BONDING WITH POLY-P-PHENYLENE BENZOBISOXAZOLE FIBER

(75) Inventors: Hiroshi Sogabe, Nara (JP); Shigehiro Isshiki, Nara (JP); Hiroyuki Yamamoto, Nagano (JP)

(73) Assignee: Unitta Company, Osaka (JP)

( * ) Notice: Subject to any disclaimer, the term of this patent is extended or adjusted under 35 U.S.C. 154(b) by 149 days.

(21) Appl. No.: 10/050,989

(22) Filed: Jan. 22, 2002

(65) Prior Publication Data

US 2002/0142147 A1 Oct. 3, 2002

(30) Foreign Application Priority Data

Jan. 25, 2001 (JP) ..................... P2001-016914

(51) Int. Cl.$^7$ .............................. B32B 15/02
(52) U.S. Cl. ............. 428/403; 428/361; 428/378; 428/407; 427/372.2; 427/442
(58) Field of Search ................ 428/361, 378, 428/403, 407, 323, 383, 295.1, 375, 300.4

(56) References Cited

U.S. PATENT DOCUMENTS 4,794,041 A * 12/1988 Gillberg-LaForce ........ 428/394
5,891,561 A * 4/1999 Kinoshita et al. ......... 428/295.1

FOREIGN PATENT DOCUMENTS

| JP | 6-280167 | 10/1994 |
| JP | 6-287866 | 10/1994 |
| JP | 7-26029 | 1/1995 |
| JP | 9-176332 | 7/1997 |
| JP | 11-012370 | 1/1999 |
| JP | 2000-303044 | 10/2000 |

OTHER PUBLICATIONS

English Language Abstract of JP 11–012370.
English Language Abstract of JP 2000–303044.
English Language Abstract of JP 9–176332
English Language Abstract of JP 7–26029.

* cited by examiner

*Primary Examiner*—Merrick Dixon
(74) *Attorney, Agent, or Firm*—Greenblum & Bernstein, P.L.C.

(57) ABSTRACT

A transmission belt comprising a belt body and a cord. The belt body is made of a rubber composition. The cord is comprised of poly-p-phenylene benzobisoxazole fiber. The cord is embedded in the belt body. The belt body and the cord are formed into an integral whole by vulcanizing the rubber composition. The surface of the cord is subjected to a primary treatment involving coating a mixture of an epoxy compound and latex and heat treating, and a secondary treatment involving coating a resorcinol-formalin-latex adhesive and heat treating.

15 Claims, 3 Drawing Sheets

TRANSMISSION BELT AND METHOD OF TREATMENT FOR BONDING WITH POLY-P-PHENYLENE BENZOBISOXAZOLE FIBER

BACKGROUND OF THE INVENTION

1. Field of the Invention

The present invention relates to a transmission belt such as a toothed belt, a V belt, and a V-ribbed belt, which transmit a drive force of an engine of an automobile to an accessory device, for example.

2. Description of the Related Art

In general, a toothed belt is provided with a belt body, cords, and a facing fabric. The belt body has teeth, receiving a load drive, and is made from rubber. The cords serve as tension bearing members, and are embedded along a longitudinal direction of the belt body. The facing fabric covers the tooth surfaces of the belt body for preventing wear.

When a toothed belt is used as a timing belt of an automobile, it is necessary that it be able to withstand use in a high temperature and high load environment. Therefore, various improvements in the materials used for toothed belts and the method of bonding of the materials have been experimented with. Specifically, a hydrogenated nitrile rubber, superior in heat resistance, has been used for the stock rubber of the belt body in place of conventional chloroprene rubber, high strength aramid fiber has been used for the cords in place of glass fiber, and a fabric comprised of aramid fiber, superior in heat resistance, has been used for the facing fabric in place of a Nylon-6, 6 fabric.

The belt body is subjected to a vulcanization process for creating three-dimensional structures by heating or otherwise treating a rubber composition comprised of the above stock rubber plus sulfur or an organic peroxide or other vulcanizing agent or plasticizer etc., whereby the elasticity, tensile strength, and dimensional stability can be improved. Further, the cords are treated for bonding by coating and drying a rubber cement or resorcinol formaldehyde latex (hereinafter referred to as "RFL"), and are then embedded in the unvulcanized belt body. At the same time as the vulcanizing molding of the belt body, the adhesive is reacted due to the heat, causing the cords to be strongly bonded to the rubber of the belt body.

In recent years, there has been research and development on poly-p-phenylene benzobisoxazole fiber (hereinafter referred to as "PBO fiber") more superior in heat resistance, flame retardance, and dimensional stability than aramid fiber. PBO fiber, however, has an extremely high crystallinity and a close-knit structure, so is poor in bondability with rubber cement or RFL adhesive. Accordingly, there is the problem that even if the conventional treatment for bonding is applied to the cords, they will not bond with the rubber of the belt body. Namely, in a toothed belt receiving a large repeating load, there is the problem in which, if the bondability of the cords is poor, interfacial breakage will occur between the two and lead to early breakage of the toothed belt.

SUMMARY OF THE INVENTION

Therefore, an object of the present invention is to improve the strength of a transmission belt, such as a toothed belt, by improving the bondability between the cords comprised of PBO fiber and the rubber of the belt body.

According to the present invention, there is provided a transmission belt comprising a belt body and a cord. The belt body is made of a rubber composition. The cord is comprised of poly-p-phenylene benzobisoxazole fiber. The cord is embedded in the belt body. The belt body and the cord are formed into an integral whole by vulcanizing the rubber composition. A surface of the cord is subjected to a primary treatment involving coating a mixture of an epoxy compound and latex, and heat treating, and a secondary treatment involving coating a resorcinol-formalin-latex adhesive, and heat treating.

Due to this, the bondability of the cords and rubber composition is improved and the strength of the transmission belt is improved.

A main ingredient of the rubber composition used for the belt body is preferably chloroprene rubber or a hydrogenated nitrile rubber, both of which are superior in heat resistance.

As the epoxy compound used for the primary treatment, a polyepoxy compound having at least two epoxy rings in a molecule and soluble in water is preferable. Specifically, a diglycerol polyglycidyl ether, polyglycerol polyglycidyl ether, or sorbitol polyglycidyl ether is preferable.

The latex used for the primary treatment is preferably an acrylonitrile butadiene rubber latex or chloroprene rubber latex.

In the primary treatment, preferably the cord is immersed in a primary treatment solution of an aqueous solution of the epoxy compound, the latex, and a ring-opening catalyst of the epoxy compound, and after the immersion, heated at 230° C. to 280° C. for a predetermined time. Preferably the ring-opening catalyst is an imidazole compound. The imidazole compound is for example 2-methylimidazole, and is preferably added in substantially an amount of 10 wt % with respect to the epoxy compound.

In the primary treatment, preferably the solid content coat after the treatment is 3 to 8 wt % with respect to the cord before the treatment.

A method of treatment for bonding with poly-p-phenylene benzobisoxazole fiber of the present invention is characterized by performing a primary treatment of coating a mixture of an epoxy compound and a latex on a surface of the poly-p-phenylene benzobisoxazole fiber and heat treating the same, and a secondary treatment of coating a resorcinol-formalin-latex adhesive and heat treating the same.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
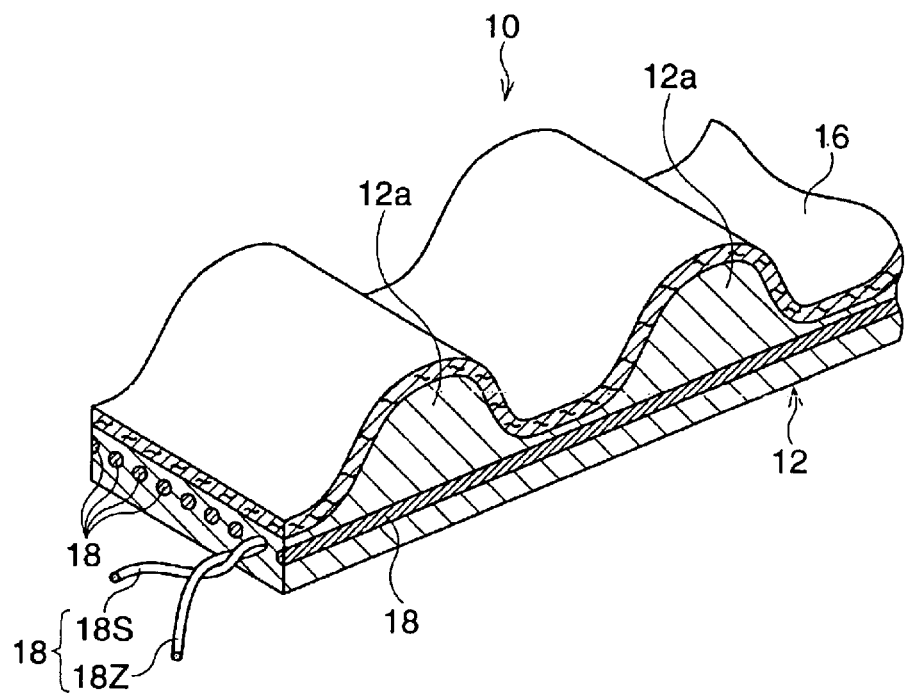
FIG. 1 is a partial perspective view of an embodiment of a transmission belt according to the present invention.

The present invention will be described below with reference to embodiments shown in the drawings.

FIG. 1 is a perspective view of part of a toothed belt. A toothed belt 10 is provided with a belt body 12 formed on one of its surfaces with teeth 12a. The teeth 12a are provided at constant intervals along the longitudinal direction of the belt body 12. The outside surface of the teeth 12a is covered by a facing fabric 16 for preventing wear. The belt body 12 has embedded in it a plurality of cords 18 arranged in parallel across the lateral direction. These cords 18 extend in the longitudinal direction of the belt body 12.

The belt body 12 is produced by a vulcanization process in which the rubber composition is vulcanized and molded simultaneously. The rubber composition is comprised of stock rubber, such as chloroprene rubber, a hydrogenated nitrile rubber, or other rubber with improved heat resistance and aging characteristics, to which a vulcanization accelerator such as sulfur and an organic oxide, filler such as vulcanizing agent and carbon black, zinc oxide, stearic acid, a plasticizer, an anti-aging agent, etc. is suitably added according to the application. When the unvulcanized rubber composition is vulcanized, covalent bonds occur between the rubber molecules, and three-dimensional structures are formed. Due to this, the belt body 12 is improved in elasticity, tensile strength, and dimensional stability.

For the facing fabric 16, a woven fabric comprised of aramid fiber or nylon fiber etc. superior in heat resistance and abrasion resistance or a blended yarn or mixed woven fabric of the same is used. It is preferable that fiber having stretchability be used in the longitudinal direction of the belt body 12 and that fiber with little stretchability be used in the lateral direction. The weave is not particularly limited, and may be a flat weave, sateen weave, twill weave, etc. The facing fabric 16 is placed into close contact with the belt body 12 before vulcanization, and made integral with the belt body 12 at the time of vulcanization and pressing.

The cords 18 are obtained by spirally winding a pair of cord elements of different twist directions, for example, an S-twist cord element 18S and a Z-twist cord element 18Z. The cord elements 18S and 18Z are comprised of yarns comprised of poly-p-phenylene bisoxazole fiber (PBO fiber) twisted together, and are formed on the outside with a plurality of coats (see FIG. 2, reference numerals 186, 187, and 188). PBO fiber is organic fiber having a high strength and high elasticity and superior in heat resistance, flame retardance, and dimensional stability. The plurality of coats function as the adhesive for improving the bondability between the PBO fiber comprising the cords 18 and the rubber comprising the belt body 12.

Figure 2:
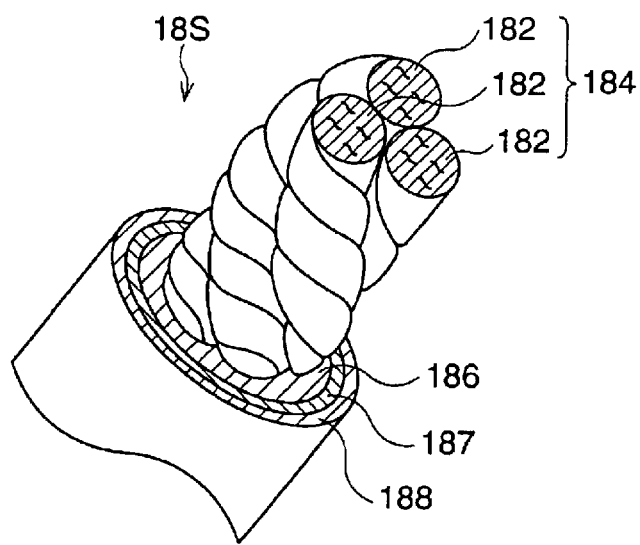
FIG. 2 is a perspective view of part of a cord shown in FIG. 1 cut away.

FIG. 2 is a perspective view schematically showing the configuration of one of the pair of cord elements forming the cord 18, that is, the S-twist cord element 18S, partially cut away. The cord 18 is manufactured as follows:

First, PBO fiber, which is the small denier filaments 182, is given a primary twist in the S-direction. Next, three primary twisted filaments 182 are bundled, and given a final twist in the same S-direction as the primary twist direction. Due to this, the S-twist cord yarn 184 is obtained. Note that the thickness and number of the filaments 182 and the number of twists and method of twisting are not limited to those described above, and may be suitably changed in accordance with the dimensions of the toothed belt 12 or the tensile strength required. For example, in the primary twist, the filaments may be twisted in the Z-direction opposite to the twist direction of the final twist.

The plurality of coats formed around the yarn 184 include a first coat 186 and a second coat 187. The first coat 186 is comprised of a mixture of an emulsion of natural rubber or a synthetic rubber, which is a latex, and an epoxy compound, and is formed around the yarn 184. The second coat 187 is comprised of an RFL adhesive, and is formed at the outside of the first coat 186.

The RFL adhesive is obtained by coating and drying an RFL solution on the material to be coated. The RFL solution is an aqueous solution comprised of a mixture of an RF resin, which is an initial condensate of resorcinol and formaldehyde, and various latexes. In general, an RFL adhesive has good compatibility with natural rubber or a styrene-butadiene rubber, chloroprene rubber, etc. By forming covalent bonds or hydrogen bonds with this rubber, a high and stable bond strength is obtained, so this is widely used as an adhesive between rubber and fiber. Further, an RFL adhesive is soluble in water, so has the advantage of little problem in safety and health compared with rubber cement and other solvent-based adhesives. However, the adhesive is inferior in bondability with a hydrogenated nitrile rubber, so the general practice has been to interpose a rubber cement between the RFL adhesive and hydrogenated nitrile rubber to improve the bonding force.

On the other hand, an RFL adhesive is known to be excellent in bondability with nylon fiber, rayon fiber, glass fiber, etc., but poor in bondability with aramid fiber. Therefore, the practice has been to interpose an epoxy-based adhesive or isocyanate-based adhesive between the RFL adhesive and aramid fiber to improve the bonding force. In the same way as aramid fiber, PBO fiber is found to be poor in bondability with an RFL adhesive. This is because PBO fiber has an extremely high crystallinity and a close-knit structure, so almost no bonds form with the PBO fiber and the RF elements in the RFL adhesive. In the same way as for the aramid fiber, it is possible to interpose an adhesive comprised of an epoxy compound, but a sufficient bonding force cannot be obtained by doing this. Therefore, in the embodiment, a first coat 186 comprised of a mixture of an epoxy compound and latex is interposed between the PBO fiber and RFL adhesive to improve the bonding force between the two.

Figure 3:
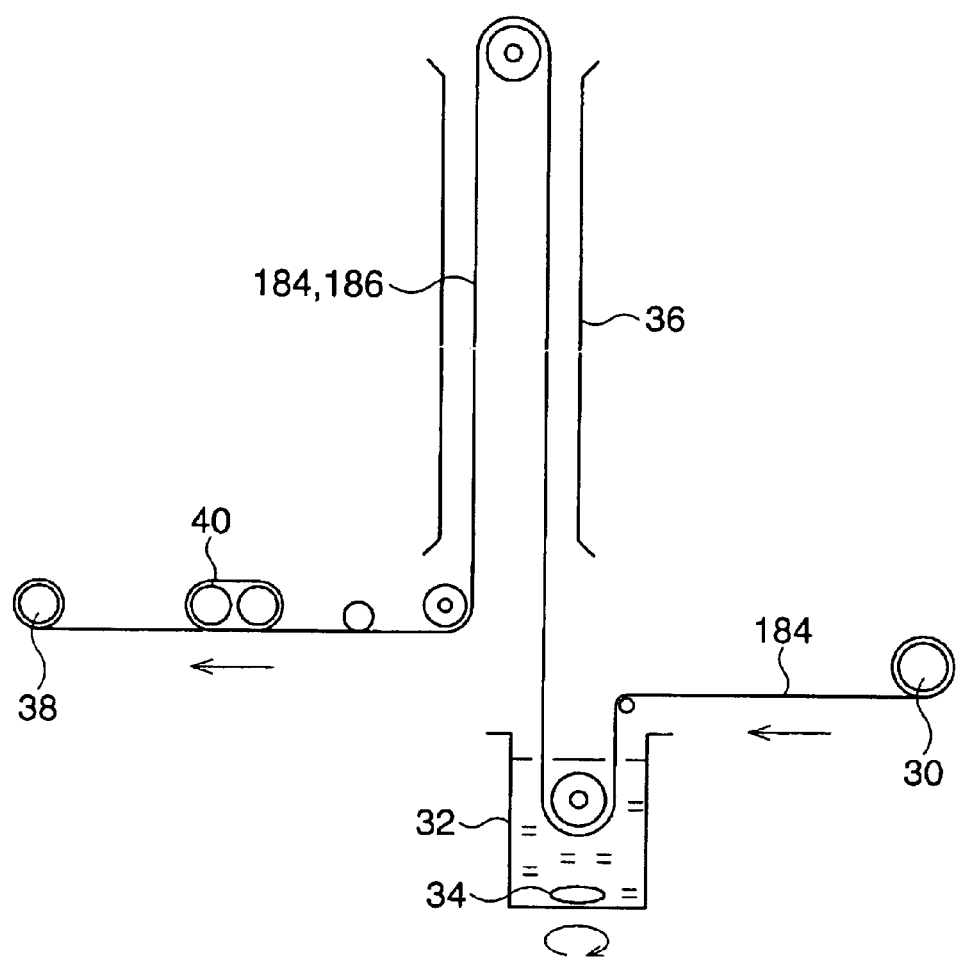
FIG. 3 is a schematic view of primary treatment of the cords in the process of production of the toothed belt shown in FIG. 1.

With reference to FIG. 3, schematically showing a coater for forming the first coat 186, a manufacturing process of the first coat 186 will be described below.

First, the solution of the epoxy compound and latex is mixed, then a curing agent, which is an imidazole compound or ring-opening catalyst of an epoxy compound such as aromatic amine, phenol resin, or acid anhydride, is added to prepare a primary treatment solution. The yarn 184 is taken up by a feed roll 30. The yarn 184 is pulled out from the feed roll 30, and led to the primary treatment solution held in an immersion tank 32. The primary treatment solution is stirred by a stirrer 34.

After immersion in the primary treatment solution, the yarn 184 is led to the upper drying stove 36 where it is heat treated. The primary treatment solution coated on the surface of the yarn is dried by the heat treatment, whereupon the solid content, that is, only the epoxy compound and latex, is left on the yarn 184. This becomes the first coat 186. The yarn 184 formed with the first coat 186 is taken up by the take-up roll 38.

A speed control roller 40 is disposed between the drying stove 36 and take-up roll 38, to control the speed of the yarn 184. Due to this, the residence time of the yarn 184 in the drying stove 36, that is, the heat treatment time, is controlled. Note that the primary treatment for forming the first coat 186 is not limited to the above method. For example, the primary treatment solution may also be coated on the surface of the yarn 184 by spraying.

The epoxy compound may be any polyepoxy compound having at least two epoxy rings in a molecule and soluble in water. Further, considering the wettability to the PBO fiber, one having a suitable viscosity is preferable. For example, diglycerol polyglycidyl ether, polyglycerol polyglycidyl ether, or sorbitol polyglycidyl ether can be used. By the reaction of the epoxy rings with the curing agent, the epoxy compound is cross-linked and cured three-dimensionally, and functions as an adhesive.

As the latex used here, an acrylonitrile butadiene rubber (hereinafter abbreviated as "NBR") latex or chloroprene rubber latex is suitable.

Further, as a curing agent, the imidazole compound 2-methylimidazole or amine compounds diphenylamine, methylbenzylamine, dimethylbenzylamine, trimethylbenzyl ammonium chloride, and sodium hydroxide, potassium hydroxide, etc. can be used. The ring-opening reaction of the epoxy compound changes depending on the type and amount added of the curing agent. The type and amount added are suitably selected in accordance with the time required for the work. For example, in the case of 2-methylimidazole, which has a relatively short gelation time and a high activity, it is preferable to add about 10 wt % with respect to the epoxy compound.

The solid content coat after the treatment is preferably 3 to 10 wt % with respect to the yarn. If the solid content coat is less than 3 wt %, a sufficient bonding force is not obtained, while if more than 10 wt %, the coat itself becomes thick, and is liable to become the interface layer at the time of breakage. The solid content coat is adjusted by the concentration of the treatment solution. To obtain the above solid content coat, the concentration of the treatment solution is preferably about 10%.

The heat treatment conditions are preferably a treatment temperature of 230° C. to 280° C. and a treatment time of 1 to 2 minutes. Under 200° C., the reaction of the epoxy compound is not sufficient, and the bondability falls. The tension at the time of treatment is not particularly limited, since the melting point of PBO fiber is a relatively high 650° C., and there is little elongation due to change in temperature from ordinary temperature to the above treatment temperature.

The second coat 187 is obtained by coating and drying an RFL solution, which is an aqueous solution of a mixture of latex and an RF resin being an initial condensate of resorcinol and formaldehyde, to the material to be coated, which is the cord elements 18S finished being formed with the first coat 186. As the latex used here, a vinylpyridine-styrene-butadiene copolymer (hereinafter abbreviated as "VP-SBR") latex is preferable. The secondary treatment for forming the second coat 187 may be performed by the same technique as the above primary treatment. Namely, similar immersion treatment and heat treatment are performed except that a roll of yarn 184 provided with the first coat 186 obtained by the primary treatment is used as the feed roll 30 and the solution in the immersion tank 32 is changed to an RFL solution.

When the stock rubber of the belt body 12 is a hydrogenated nitrile rubber, it is preferable to further provide a third coat 188 comprised of rubber cement at the outside of the second coat 187. Rubber cement is comprised of the same hydrogenated nitrile rubber as the stock rubber dissolved in toluene or another suitable solvent plus additives, invades the unevenness on the surfaces of the second coat 187 or belt body 12, and cures so as to bond the two by an anchor effect. The tertiary treatment for forming the third coat 188 may be performed by the same techniques as the above primary treatment, but for drying the rubber cement, it is preferable to set the treatment temperature low to about 100° C. and treat for a time of about 60 seconds.

The Z-twist cord elements 18Z are substantially the same as the S-twist cord elements 18S except that the primary twist and final twist are in the Z-direction. Cords 18 comprised of pairs of cord elements 18S and 18Z wound spirally are embedded in the belt body 12 before vulcanization. At the same time as the vulcanizing molding of the belt body 12, the coats 186, 187, and 188 are heated and reacted, whereby the cords 18 are strongly bonded to the belt body 12.

In this way, in the toothed belt 10 of the embodiment, the first coat 186 comprised of a mixture of an epoxy compound and latex is interposed between the surface of PBO fiber (yarn 184) and the RFL adhesive (second coat 187), whereby it is possible to improve the bondability of the cords 18 comprised of the PBO fiber and the rubber composition of the belt body 12 and possible to enhance the strength of the toothed belt 10. Further, since the primary treatment solution and secondary treatment solution used in the embodiment are both soluble in water, the embodiment is superior in environment and health compared with treatment using a conventional organic solvent.

EXAMPLES

Examples of the present invention will be explained in further detail below.

In the following Examples 1 to 4 and Comparative Example 1, five test pieces were formed for measuring the bonding strength of cords, changes were made in only the formulation of the primary treatment solution, with respect to a belt rubber composition. The test pieces were subjected to bonding strength tests. Note that in Table 1, "-" indicates no addition.

TABLE 1

|  | Ex. 1 | Ex. 2 | Ex. 3 | Ex. 4 | Comp. Ex. 1 |
|---|---|---|---|---|---|
| Cord | | | | | |
| PBO fiber *1 | | | | | |
| Primary treatment solution | | | | | |
| Material | | | | | |
| Epoxy compound *2 | 2 | 5 | 5 | 5 | 2.22 |
| NBR latex (45%) *3 | 4.44 | 11.1 | 11.1 | 11.1 | — |
| Sodium hydroxide (10%) | 2 | 5 | — | — | 0.28 |
| 2-methylimidazole (10%) | — | — | 5 | 0.5 | — |
| Aerosol OT (5%) | — | — | — | — | 2.24 |
| Water | 91.56 | 78.9 | 78.9 | 78.9 | 95.26 |
| Total | 100.00 | 100.00 | 100.00 | 100.00 | 100.00 |
| Solid content coat | 2 | 5 | 5 | 5 | 0.2 |
| Secondary treatment solution | | | | | |
| Resorcinol | | | 1.88 | | |
| Formalin (37%) | | | 2.76 | | |
| VP-SBR latex (40.5%) *4 | | | 42.10 | | |
| Sodium hydroxide (10%) | | | 0.51 | | |
| Ammonia water (28%) | | | 3.32 | | |
| Water | | | 49.43 | | |
| Total | | | 100.00 | | |
| Body rubber | | | Rubber formulation A | | |
| Bond strength (n/15 mm) | 100 | 110 | 140 | 90 | 50 |
| Peeling portion | Interface | Interface | Rubber | Interface | Interface |

(Units other than bond strength are wt %)
*1: Product name Zylon AS 1110dtx filament; Toyobo Corp.
*2: Diglycerol polyglycidyl ether: Product name Denacol EX421; Nagase Kasei Kogyo
*3: Acrylonitrile butadiene rubber latex: Product name Nipol NUN5100; Nippon Zeon
*4: Vinylpyridine-styrene-butadiene copolymer rubber latex; product name Nipol 2518FS; Nippon Zeon

Example 1

First, 1000 denier PBO fiber (Zylon AS 1110dtx filaments made by Toyobo Corp.) were given primary twists in the S-direction, and three of the primary twisted PBO fibers were bundled together and a given final twist in the S-direction. The result was used as the yarn cord. The yarn cord was subjected to the primary treatment and secondary treatment by the coater shown in FIG. 3.

In the primary treatment solution, diglycerol polyglycidyl ether (Denacol EX421 made by Nagase Kasei Kogyo) was used as the epoxy compound, an NBR latex having a latex content of 45 wt % (Nipol NUN5100 made by Nippon Zeon) was used as the latex, and a 10% solution of sodium hydroxide was used as the ring-opening catalyst of the epoxy compound. 2 wt % of diglycerol polyglycidyl ether and 4.44 wt % of NBR latex (solid content 2 wt %) were added to produce a 1:1 ratio of solid content of the epoxy compound and latex, 2 wt % of a 10% solution of sodium hydroxide (content 0.2 wt %) was added to produce 10 wt % sodium hydroxide with respect to the epoxy compound, and then water was added to make 100 wt % with respect to the total weight, to thereby prepare the primary treatment solution.

500 ml of the primary treatment solution blended as in the above was prepared, the yarn cord was immersed by a coater, then the cord was heat treated under conditions of a treatment temperature of 250° C. and a treatment time of 100 seconds. The solid content coat at this time was 2 wt %.

The secondary treatment solution, that is, the RFL solution, will be explained below. First, 1.88 wt % of resorcinol was dissolved in water, then 2.76 wt % of a formalin solution having a concentration of 37% and 0.51 wt % of a sodium hydroxide solution having a concentration of 10% were added and stirred together. The mixture was aged at 30° C. for 6 hours. The production of the RF resin was confirmed, then 42.10 wt % of a vinylpyridine-styrene-butadiene copolymer rubber latex having a latex content of 40.5% (Nipol 2518FS made by Nippon Zeon) and 49.43 wt % of ammonia water having a concentration of 28% were added, and water was added to make 100 wt % with respect to the total weight to prepare the secondary treatment solution. This was aged at room temperature for 12 hours.

500 ml of the secondary treatment solution blended as in the above was prepared, the primary treated yarn cord was immersed by a coater, then the cord was heat treated under conditions of a treatment temperature of 250° C. and a treatment time of 100 seconds.

Next, the cord obtained by the primary treatment and second treatment was used to prepare a test piece. As the rubber composition used for the test piece, the rubber formulation A shown in Table 2 was used.

TABLE 2

| Rubber formulation A | |
|---|---|
| Chloroprene rubber | 100 |
| Carbon black | 40 |
| Stearic acid | 2 |
| Petroleum-based softener | 10 |
| Pine tar | 4 |
| Zinc oxide | 5 |
| N-phenyl-β-naphthylamine | 1.5 |
| 2-benzothiazolyl sulfide | 0.75 |
| Diphenylguanine | 0.75 |
| Sulfur | 3.5 |
| Total | 167.5 |
| | (Unit: wt %) |

As shown in Table 2, the rubber formulation A used chloroprene rubber as the stock rubber, and consisted of 40 parts by weight of carbon black, 2 parts by weight of stearic acid, 10 parts by weight of petroleum-based softener, 4 parts by weight of pine tar, 5 parts by weight of zinc oxide, 1.5 parts by weight of N-phenyl-β-naphthylamine, 0.75 parts by weight of 2-benzothiazolyl sulfide, 0.75 parts by weight of diphenyl guanidine, and 3.5 parts by weight of sulfur as a vulcanizing agent, with respect to 100 parts by weight (phr) of this chloroprene rubber.

A rubber sheet of a thickness of 4 to 5 mm (reference numeral 56; see FIG. 4) was obtained by extrusion from this rubber formulation A. The rubber sheet 56 was cut to a length of 120 mm, and treated cords of a length of 120 mm (reference numeral 54, see FIG. 4) were arranged without clearance across a width of 15 mm. In Example 1, the diameter of the cord 54 was about 0.7 mm and the number of cords was 21. Facing fabric (reference numeral 52, see FIG. 4) was attached on the cords 54 for protection. The thus obtained test piece (reference numeral 50; see FIG. 4) was placed in a mold, and pressed and vulcanized. The vulcanization conditions were 150° C.×20 minutes. After vulcanization, the piece was cooled at room temperature, then the bond strength was measured by a tensile tester (Model AG-500 Autoclave made by Shimazu Seisakusho).

Figure 4:
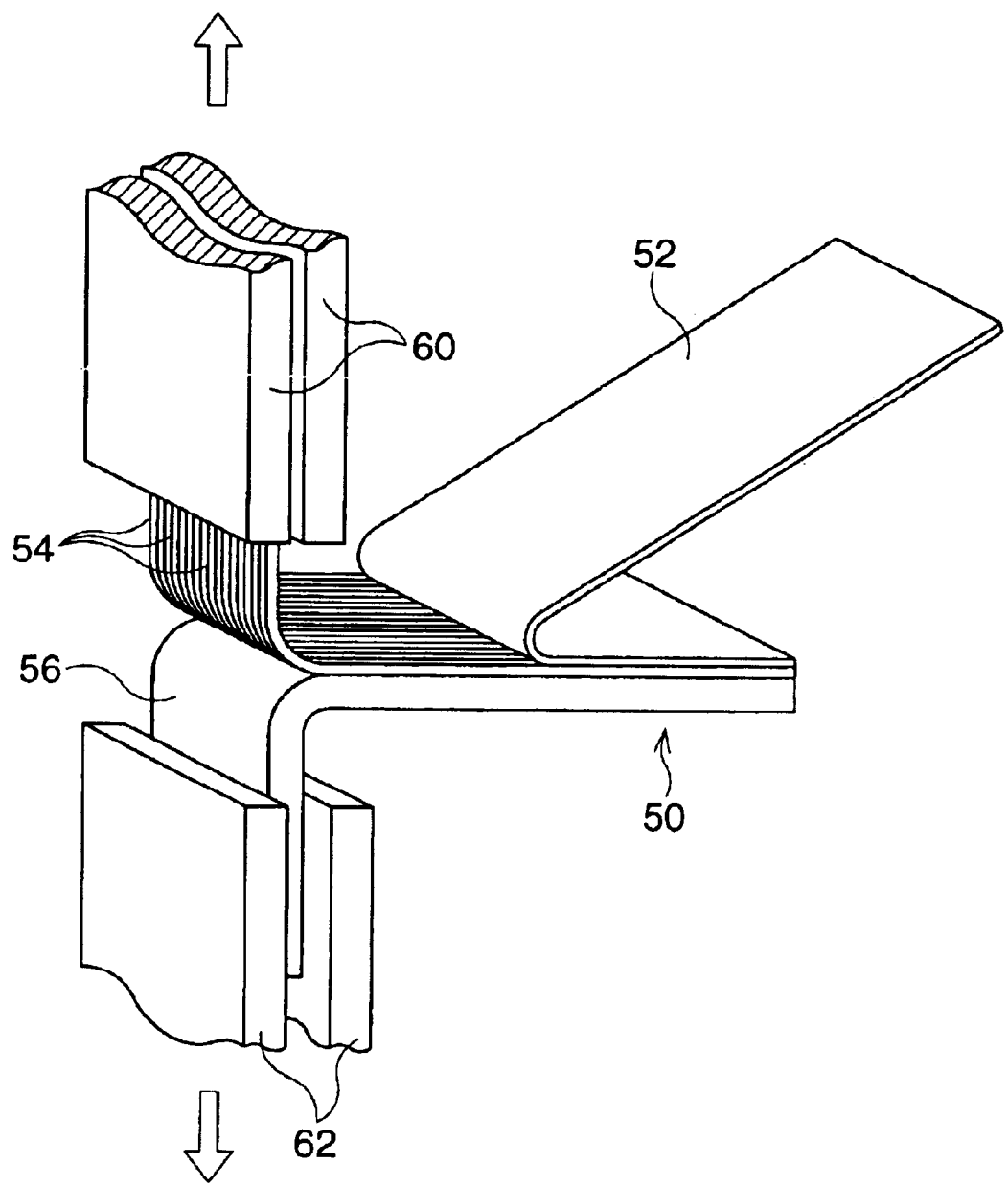
FIG. 4 is a perspective view of a test for evaluation of the bond strength of cords and rubber composition showing a test piece attached to a tester.

FIG. 4 is a perspective view of the state of the test piece 50 attached to a tensile tester. In the tensile test, first, the facing fabric 52 was peeled from the test piece 50 to a certain extent, and a cut was then made between the cords 54 and the rubber sheet 56 at the peeled end. The end of the cords 54 and the end of the rubber sheet 56 were attached to the clamps 60 and 62, and tension was applied in a direction for peeling the same from each other, that is, to the cords 54 upward in the drawing and to the rubber sheet 56 downward in the drawing, at an elastic stress rate of 50 mm/min. The force required for peeling of the cords 54 and rubber sheet 56 was measured, and the average of five peak values was evaluated as the bond strength. Further, the peeling location at this time was evaluated visually.

In Example 1, as shown in Table 1, the bond strength was 100 N/15 mm. The peeling location was confirmed to be the interface between the cords 54 and the rubber sheet 56.

Example 2

In Example 2, the test piece 50 was prepared and the bond strength evaluated by the same methods as in Example 1 other than the difference in the ingredients of the primary treatment solution. In the primary treatment solution of Example 2, as shown in Table 1, the content of the epoxy compound was made 5 wt %, the latex 11.1 wt % (5 wt % solid content), and the sodium hydroxide aqueous solution 5 wt %. The amounts were made 2.5 times those in Example 1. The solid content coat at this time was 5 wt % with respect to the yarn, while the bond strength was 110N/15 mm. The peeling location was confirmed to be the interface between the cords 54 and the rubber sheet 56.

Example 3

In Example 3, the test piece 50 was prepared and the bond strength evaluated by the same methods as in Examples 1 and 2 other than the difference in the ingredients of the primary treatment solution. In the primary treatment solution of Example 3, as shown in Table 1, the content of the epoxy compound was made 5 wt % and latex 11.1 wt % (5 wt % solid content). The amounts were made the same as in Example 2. Further, 2-methylimidazole having a concentration of 10% was used as a ring-opening catalyst of the epoxy compound instead of sodium hydroxide. This was added in the amount of 5 wt % (content of 0.5 wt %) or ¹/₁₀ of the epoxy compound. The solid content coat at this time was 5 wt % with respect to the yarn, while the bond strength was 140N/15 mm. The peeling location was confirmed to be not the interface between the core cords 54 and the rubber sheet 56, but breakage occurring inside the rubber sheet 56.

Example 4

In Example 4, the test piece 50 was prepared and the bond strength evaluated by the same methods as in Examples 1 to 3 other than the difference in the ingredients of the primary treatment solution. In the primary treatment solution of Example 4, as shown in Table 1, the content of the epoxy compound was made 5 wt % and latex 11.1 wt % (5 wt % solid content). The amounts were made the same as in Example 3. Further, 2-methylimidazole having a concentration of 10% the same as Example 3 was used as a ring-opening catalyst of the epoxy compound. This was added in amount of 0.5 wt % (content of 0.05 wt %) or ¹⁄₁₀₀ of the epoxy compound. The solid content coat at this time was 5 wt % with respect to the yarn, while the bond strength was 90N/15 mm. The peeling location was confirmed to be the interface between the cords 54 and the rubber sheet 56.

Comparative Example 1

In Comparative Example 1, the test piece 50 was prepared and the bond strength evaluated by the same methods as in Examples 1 to 4 other than the difference in the ingredients of the primary treatment solution. In the primary treatment solution of Comparative Example 1, as shown in Table 1, 2.22 wt % of the epoxy compound and 0.28 wt % of an aqueous solution of sodium hydroxide having a concentration of 10%, the same as in Examples 1 and 2 serving as a ring-opening catalyst of the epoxy compound, were added, while latex was not added. Further, Aerosol OT having a concentration of 5% was added in an amount of 2.24 wt % as a humectant for enabling the epoxy compound to be easily coated on the PBO fiber. The solid content coat at that time was 0.2 wt % with respect to the yarn. Further, the bond strength was 50N/15 mm. The peeling location was confirmed to be the interface between the cords 54 and the rubber sheet 56.

From the above results, it is understood that each of Examples 1 to 4 where latex is added to the primary treatment solution is improved in the solid content coat and bond strength compared with Comparative Example 1 where latex is not added.

Comparing Examples 1 and 2, if the solid content of the epoxy compound and latex is 2.5 times greater, the solid content coat also becomes 2.5 times greater, and the bond strength is improved. Comparing Examples 2 and 3, it is understood that use of 2-methylimidazole rather than sodium hydroxide results in an extremely improved bond strength. Further, since breakage occurs in the rubber sheet 56 rather than at the interface due to the tension, it is understood that the cords 54 and rubber sheet 56 are strongly bonded. The difference between Examples 3 and 4 is only that the amount of the ring-opening catalyst (2-methylimidazole) is 10 wt % or 1 wt % with respect to the epoxy compound. It is understood that, although there is no difference in the solid content coats at that time, the bond strengths are very different, and an amount of catalyst of about 10 wt % with respect to the epoxy compound is suitable.

Note that the present invention can be applied to a transmission belt including a V belt, a V-ribbed belt, etc., while the embodiment described above is a toothed belt.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2001-16914 (filed on Jan. 25, 2001) which is expressly incorporated herein, by reference, in its entirety.

What is claimed is:

1. A transmission belt comprising:
   a belt body made of a rubber composition; and
   a cord comprised of poly-p-phenylene benzobisoxazole fiber, said cord being embedded in said belt body, said belt body and said cord being formed into an integral whole by vulcanizing said rubber composition;
   a surface of said cord being subjected to a primary treatment involving coating a mixture of an epoxy compound and latex and heat treating, and a secondary treatment involving coating a resorcinol-formalin-latex adhesive and heat treating.

2. A transmission belt according to claim 1, wherein a main ingredient of said rubber composition is one of chloroprene rubber and hydrogenated nitrile rubber.

3. A transmission belt according to claim 2, wherein said epoxy compound is a polyepoxy compound having at least two epoxy rings in a molecule, and is soluble in water.

4. A transmission belt according to claim 3, wherein said epoxy compound is one of diglycerol polyglycidyl ether, polyglycerol polyglycidyl ether, and sorbitol polyglycidyl ether.

5. A transmission belt according to claim 1, wherein said latex is one of an acrylonitrile butadiene rubber latex and chloroprene rubber latex.

6. A transmission belt according to claim 1, wherein said cord is produced by immersing poly-p-phenylene benzobisoxazole fibers in a primary treatment solution of an aqueous solution of said epoxy compound, said latex, and a ring-opening catalyst of said epoxy compound, and after the immersion, heating at 230° C. to 280° C. for a predetermined time.

7. A transmission belt according to claim 6, wherein said ring-opening catalyst is an imidazole compound.

8. A transmission belt according to claim 7, wherein said ring-opening catalyst is 2-methylimidazole.

9. A transmission belt according to claim 6, wherein said ring-opening catalyst is added in an amount substantially equal to 10 wt % with respect to the epoxy compound.

10. A transmission belt according to claim 1, wherein the solid content coat after said primary treatment is 3 to 8 wt % with respect to said cord before said primary treatment.

11. A method of treatment for bonding with poly-p-phenylene benzobisoxazole fiber, said method comprising:
   a primary treatment involving coating a mixture of an epoxy compound and a latex on a surface of said poly-p-phenylene benzobisoxazole fiber and heat treating the same; and
   a secondary treatment involving coating a resorcinol-formalin-latex adhesive and heat treating the same.

12. A transmission belt according to claim 1, wherein the latex is present in the primary treatment at a concentration between 4 to 12% of a primary treatment solution.

13. The method according to claim 11, wherein the concentration of latex in the mixture of the primary treatment is between 4 to 12% of the mixture.

14. A transmission belt according to claim 1, wherein the cord has a bond strength (N/15 mm) of between 90 to 140.

15. The method according to claim 11, wherein the method results in a cord having a bond strength (N/15 mm) of between 90 to 140.

* * * * *